US006870797B2

(12) United States Patent
Reasoner et al.

(10) Patent No.: US 6,870,797 B2
(45) Date of Patent: Mar. 22, 2005

(54) MEDIA STORAGE SYSTEM USING A TRANSPONDER FOR TRANSMITTING DATA SIGNAL

(75) Inventors: Kelly J Reasoner, Ft Collins, CO (US); Kristianne E Johnson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 829 days.

(21) Appl. No.: 09/754,955

(22) Filed: Jan. 4, 2001

(65) Prior Publication Data

US 2004/0202061 A1 Oct. 14, 2004

(51) Int. Cl.[7] .............................................. G11B 21/08
(52) U.S. Cl. ................................ 369/30.29; 369/30.34; 700/214
(58) Field of Search ........................ 369/30.31, 30.29, 369/30.28, 30.3, 30.34, 30.32, 30.35, 30.37, 30.38; 700/215, 213, 214, 255, 217, 218; 340/10.51, 10.52, 825.72

(56) References Cited

U.S. PATENT DOCUMENTS

| 4,839,875 A | * | 6/1989 | Kuriyama et al. ............ 369/14 |
| 5,870,245 A | | 2/1999 | Kersey et al. |
| 5,963,134 A | * | 10/1999 | Bowers et al. ........... 340/572.1 |
| 5,971,281 A | * | 10/1999 | Frary et al. ................. 235/487 |
| 6,175,539 B1 | * | 1/2001 | Holmquist et al. ....... 369/30.28 |
| 6,201,474 B1 | * | 3/2001 | Brady et al. ............. 340/572.8 |
| 6,231,291 B1 | * | 5/2001 | Mueller et al. ............. 414/277 |

FOREIGN PATENT DOCUMENTS

EP          1039410 A1      9/2000

OTHER PUBLICATIONS

RFID Transponders Will Enable Faster Back–up, Access and Restore Times for Tapes Storing up to 200 Gbytes of Computer Data, Hewlett–Packard/Philips Semiconductors Press Release, Sunnyvale, California, Nov. 1, 1999, 2 pages.

* cited by examiner

Primary Examiner—Tan Dinh

(57) ABSTRACT

An apparatus and method for retrieving data related to a data cartridge contained in a media storage system. A transponder (e.g., an RFID transponder) is attached to the data cartridge for storing the related data and a reader attached to a cartridge access device of the media storage system is positionable adjacent the data cartridge for reading the related data from the transponder. The reader is attached to a cartridge plunge mechanism so that the reader is positioned near the transponder regardless of the mechanical tolerances of the media storage system. Once positioned adjacent one another, the transponder is activated and queried by the reader. The transponder transmits a data signal containing the related data to the reader and a controller operatively associated with the reader processes the data signal.

19 Claims, 4 Drawing Sheets

MEDIA STORAGE SYSTEM USING A TRANSPONDER FOR TRANSMITTING DATA SIGNAL

FIELD OF THE INVENTION

The invention pertains to retrieving data related to a data cartridge in a media storage system, and more specifically, to retrieving the related data from a transponder attached to the data cartridge using a reader attached to a cartridge access device of the media storage system.

BACKGROUND OF THE INVENTION

Media storage systems are commonly used to store data cartridges and to retrieve desired data cartridges so that computer readable data may be written to or read from the data cartridges. As such, large volumes of computer readable data can be stored on numerous data cartridges and accessed by a single computer or by multiple computers connected to the media storage system over a network. Such media storage systems are often referred to as "juke box" storage systems, and may include a cartridge storage rack or "magazine" and a cartridge read/write device. The cartridge storage rack serves as a storage location for the data cartridges. Multiple storage racks are commonly arranged so that they form one or more vertical stacks. The media storage system also includes a cartridge access device for moving among and accessing the data cartridges stored therein.

When a computer connected to the media storage system issues a request to access a data cartridge to read and/or write data thereto, a control system moves the cartridge access device among the storage racks until the cartridge access device is positioned adjacent the requested data cartridge. The cartridge access device then removes the data cartridge from the storage rack and delivers it to the read/write device for the computer to access the computer readable data stored thereon.

Once a request to access a data cartridge is received, the control system must be able to locate or otherwise recognize the requested data cartridge in the storage rack. One solution is to maintain a "map" indicating the identity and position of each data cartridge in the storage rack. However, the map must be periodically updated to ensure that the map contains accurate data. Events that will usually indicate a need to update the map include, but are not limited to, adding or removing a data cartridge from the system, operating a cartridge "mail slot", or a system power cycle (i.e., if the data storage system is turned off). Likewise, when the computer readable data contained on an existing data cartridge in the storage rack is changed, the map must be updated to reflect the changed content of the data cartridge at that position. Other examples where the map must be updated include, moving a data cartridge to another position in the storage rack, adding another storage rack to the media storage system, or otherwise changing the configuration of the system.

One solution to maintaining the map is to manually inventory the media storage system each time a change occurs. However, this is time consuming and prone to human error. Another solution for maintaining the map is to label each data cartridge stored in the media storage system with a machine-readable code, such as a bar code label and to read the bar code label with a scanner attached to the cartridge access device. However, the data cartridges may be positioned in the storage rack in close proximity to one another. Therefore, the cartridge access device and the data cartridge must be carefully aligned to correctly scan the bar code. Furthermore, the bar code only contains limited information (e.g., an identification number), and cannot be rewritten. Any further information must be stored separately (e.g., in a "look-up" table or other suitable database). For example, a "look-up" table may associate the identification number contained on the bar code with a date, data format, data type, etc.

Therefore, a need exists for a system to store the cartridge identification and other data related to the data cartridge. Ideally, such a system can store the cartridge identification and other data without the need for separate "look-up" tables.

SUMMARY OF THE INVENTION

An apparatus for retrieving data related to a data cartridge contained in a media storage system may comprise a cartridge access device for retrieving and transporting the data cartridge within the media storage system. A transponder mounted to the data cartridge transmitting a data signal containing data related to the data cartridge. A reader mounted to the cartridge access device receives the transmitted data signal. A controller operatively associated with the reader operates the reader to activate and query the transponder to transmit the data signal to the reader.

Also disclosed is a method for retrieving data related to a data cartridge in a media storage system that includes the following steps: positioning a cartridge access device adjacent the data cartridge; transmitting a data signal containing the data related to the data cartridge; and, receiving the transmitted data signal at a reader attached to the cartridge access device.

BRIEF DESCRIPTION OF THE DRAWINGS

Illustrative and presently preferred embodiments of the invention are illustrated in the drawings in which.

DESCRIPTION OF THE PREFERRED EMBODIMENT

Figure 1:
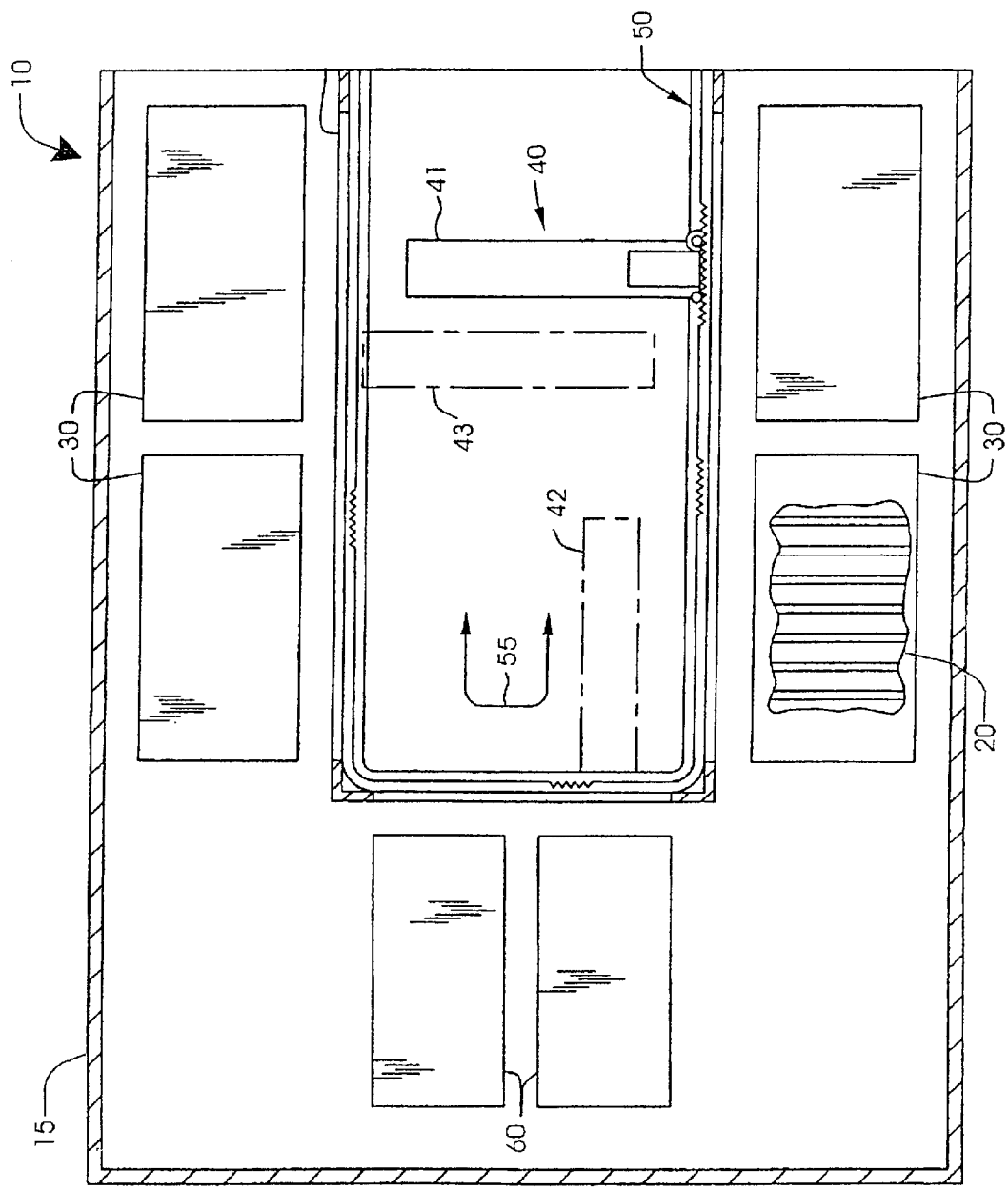
FIG. 1 is a plan view of a storage system that utilizes the apparatus for retrieving data according to one embodiment of the invention.

Apparatus 10 for retrieving data related to a data cartridge 20 is shown and described herein as it could be used with a data or media storage system 15. Briefly, media storage systems 15 are used to store large volumes of computer readable data. The computer readable data is typically stored on multiple data cartridges 20 that are arranged in the media storage system 15 on cartridge storage racks 30. It is therefore desirable to identify individual data cartridges 20 and the data stored thereon with as much information that is possible without having to physically remove the data cartridge 20 from the cartridge storage rack 30. The present invention relates to a method and apparatus for reading data related to the data cartridge 20.

The media storage system 15 may include a cartridge access device 40. The cartridge access device 40 can be moved among the cartridge storage racks 30 and positioned adjacent a data cartridge 20 to access the data cartridges 20 stored therein. According to the teachings of the invention, a reader 140 is mounted to the cartridge access device 40 and data related to the data cartridge 20 (e.g., cartridge ID, user, data origin, date, data format, load count, etc.) is stored in a transponder 150 mounted thereon. As such, the related data can be read from each data cartridge 20 as the cartridge access device 40 is moved among the storage racks 30 and each cartridge stored therein can be automatically inventoried. That is, where a user makes a request to inventory the data cartridges 20 stored in the media storage system 15, the related data (e.g., cartridge ID, data format, date, etc.) can be read from each data cartridge 20 as the cartridge access device 40 is moved among the storage racks 30 and the related data displayed or stored in a database for later use. Thus, when a request is made to read and/or write data to a data cartridge 20, the requested data cartridge 20 is readily recognized, removed from the storage rack 30, and delivered to the read/write device 60 for access to the computer readable data stored thereon. Likewise, where a data cartridge 20 is placed in a mail slot (i.e., a drop-off point, not shown) in the media storage system 15, the related data is read to identify the data cartridge 20 so that the data cartridge 20 is returned or entered at the appropriate position in the storage rack 30. Furthermore, the user may search for a data cartridge 20 as the cartridge access device 40 is moved among the storage racks 30 and the related data is read from the data cartridge 20 and transmitted to the user.

The method of the present invention preferably includes positioning the cartridge access device 40, and hence the reader 140, adjacent the data cartridge 20 and activating the transponder 150. The activated transponder 150 transmits a data signal containing the data related to the data cartridge 20, which is received at the reader and processed by the controller 147. For example, the related data may be displayed for a user browsing the media storage system 15, used to create an inventory for immediate or later use, used to identify a requested data cartridge 20, etc.

It is important to recognize that the data cartridges 20 may be closely packed in the storage rack 30. Therefore, the likelihood exists for interference with transponders 150 on nearby data cartridges 20. The invention addresses this concern by preferably mounting the reader 140 to a cartridge plunge mechanism 90 movable between extended and retracted positions within the cartridge access device 40. Thus, the reader 140 can be extended toward the data cartridge 20 or retracted therefrom for more accurate positioning. In addition, mounting the reader 140 to the movable cartridge plunge mechanism 90 allows the reader 140 to be positioned near the data cartridge 20 without the reader 140 physically contacting the transponder 150. As such, the reader 140 and the transponder 150 are protected against physical wear.

It is also important to recognize that the mechanical tolerances (i.e., the distance between the data cartridge 20 and the cartridge access device 40) may vary from one media storage system 15 to another. Indeed, the mechanical tolerances may vary within a single media storage system 15 between one storage rack 30 and another or even between one data cartridge 20 and another. Therefore, in media storage systems 15 where mechanical tolerances vary, the reader 140 may not be sufficiently close to the transponder 150 in some instances. The invention addresses this concern by individually adjusting the position of the reader 140 at each data cartridge 20 using the cartridge plunge mechanism 90. That is, the cartridge plunge mechanism 90, and hence the reader 140 mounted thereto, can be extended or retracted to maintain the desired distance between the reader 140 and the transponder 150 at each data cartridge 20, regardless of the variability in the mechanical tolerances of the media storage system 15.

Having generally described methods and apparatus for retrieving data related to a data cartridge 20 in a media storage system 15 and several advantages thereof, the methods and apparatus will now be described in further detail.

The apparatus 10 for reading data related to the data cartridges 20 may comprise a media storage system 15 such as that shown in FIG. 1. The media storage system 15 includes data cartridges 20 stored in one or more storage racks 30. In use, a control system (not shown) moves a cartridge access device 40 along a positioning rail 50 adjacent the data cartridges 20. Hence, according to the teachings of the invention, data related to a data cartridge 20 can be read (i.e., using standard protocols) when the cartridge access device 40 is positioned adjacent the data cartridge 20. For purposes of illustration, the cartridge access device 40 is shown in positions 41, 42, and 43 in FIG. 1. The cartridge access device 40 is shown adjacent the data cartridge 20 contained in the storage rack 30 at positions 41 and 43, and is shown adjacent the read/write device 60 at position 42.

In use, a computer (not shown) linked to the media storage system 15 (e.g., via a direct connection, remote connection, network connection, etc.) may issue a request to access a data cartridge 20 or to inventory the data cartridges 20 stored in the media storage system 15. In response, the control system moves the cartridge access device 40 along the positioning rail 50 adjacent the data cartridges 20. Where access to a data cartridge 20 is requested, the control system positions the cartridge access device 40 adjacent the requested data cartridge 20, and signals the cartridge access device 40 to withdraw the data cartridge 20 from the storage rack 30 and to carry it to the read/write device 60 where the linked computer can access the computer readable data stored thereon. The requested data cartridge 20 can be readily identified from the data related to the data cartridge 20 and read at the cartridge access device 40, as explained in more detail below. Where the data cartridges 20 are to be inventoried, the related data is read from each data cartridge 20 as the access device 40 is moved about the media storage device 15. It is understood that the invention contemplates both reading the related data from each data cartridge 20 by stopping the cartridge access device 40 adjacent each data cartridge 20 and/or "on the fly" as the cartridge access device 40 is moving along the positioning rail 50.

Figure 2:
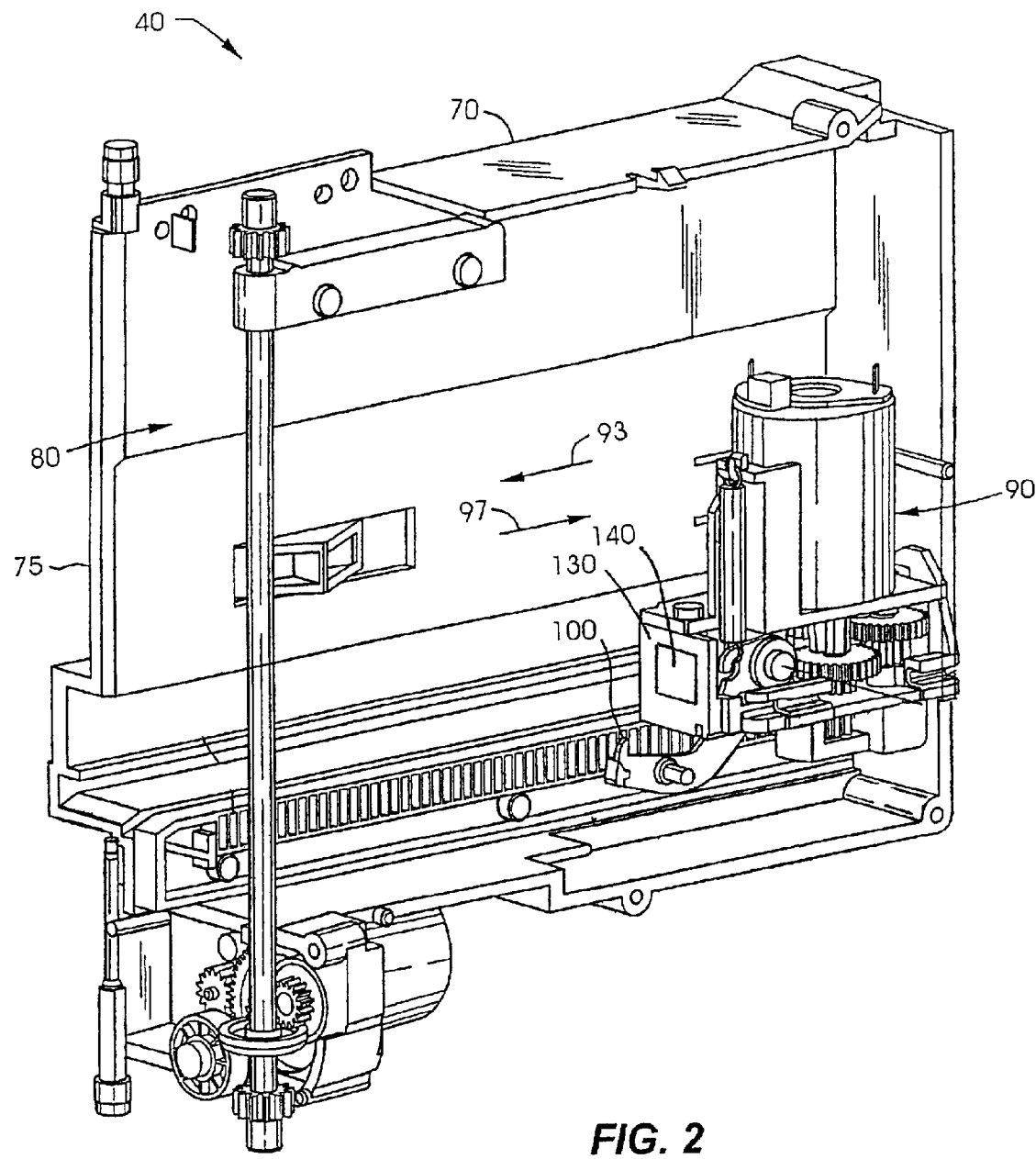
FIG. 2 is a perspective view of a cartridge access device associated with the data storage system with a side member removed to show a reader attached to a moveable cartridge plunge mechanism mounted within the cartridge access device.

The cartridge access device 40 shown in FIG. 2 may include a frame assembly 70 that defines a chamber or cavity 80 sized to receive the data cartridge 20 therein (e.g., for carrying it to the read/write device 60). A cartridge plunge mechanism 90 is slidably mounted to the frame assembly 70 so that the cartridge plunge mechanism 90 may be moved toward (i.e., extended) and away (i.e., retracted) from the cartridge access end 75 of the frame assembly 70, generally in the directions indicated by arrows 93 and 97, respectively. As such, the reader 140 can be mounted to the cartridge plunge mechanism 90 and thus be further positioned near the data cartridge 20 by moving the cartridge plunge mechanism 90 between the extended and retracted positions. The cartridge plunge mechanism 90 may also be provided with a finger assembly 100 configured to engage the data cartridge 20. The finger assembly 100 allows the cartridge plunge mechanism 90 to engage and withdraw the data cartridge 20 from the storage rack 30 and the read/write device 60 when so requested.

An optional encoder system (not shown) may provide an output signal from which information may be derived about the position of the cartridge plunge mechanism 90 within the frame assembly 70 (e.g., along the path indicated by arrows 93, 97). The encoder system can thus be used to determine the position of the reader 140 on the cartridge plunge mechanism 90 for positioning the reader 140 adjacent the data cartridge 20. In one embodiment, the encoder system may include an elongate linear reference member having a plurality of index marks thereon. A detector assembly (not shown) mounted to the cartridge plunge mechanism 90 detects the index marks on the elongate linear reference member and produces an output signal indicative of the presence or absence of an index mark. A picker control system (not shown) connected to the detector assembly may derive information relating to the position, velocity, and acceleration of the cartridge plunge mechanism 90 based on the output signal produced by the detector assembly. The picker control system may use such information to control the operation and movement of the cartridge plunge mechanism 90 in the directions of arrows 93 and 97.

Figure 3:
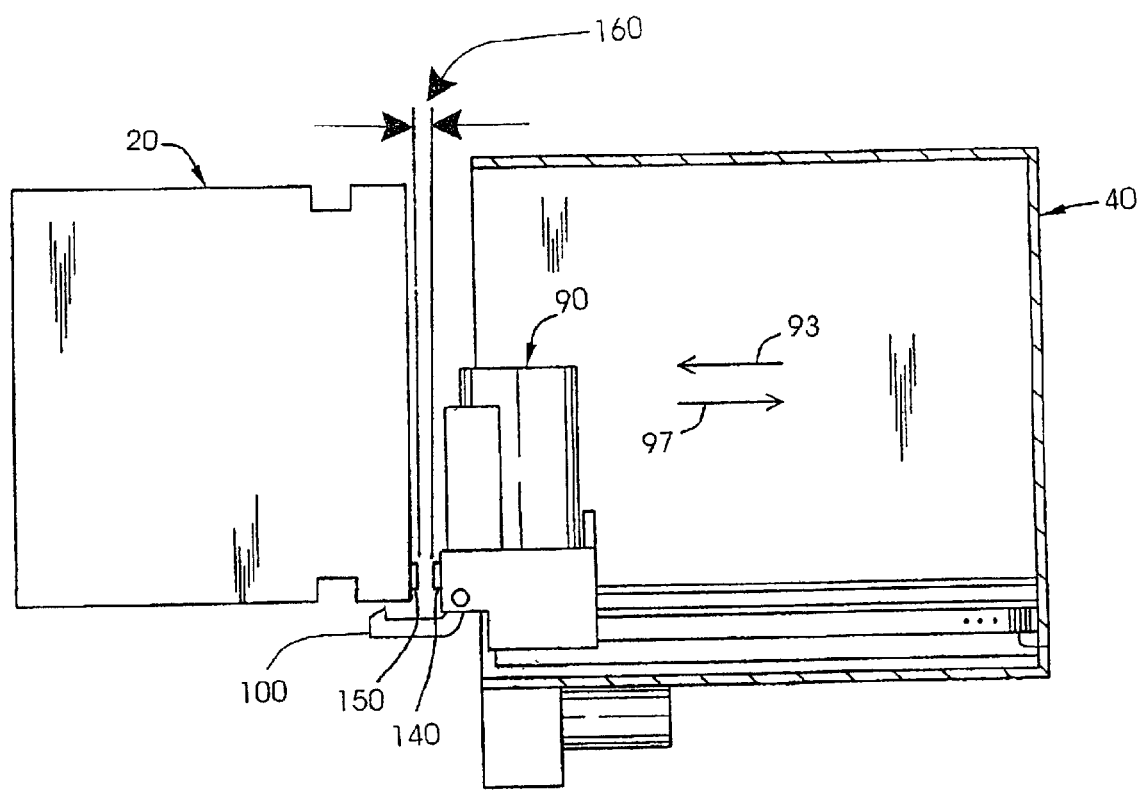
FIG. 3 is a simplified cross-sectional view of the cartridge access device with the cartridge plunge mechanism shown in the extended position so that the reader is positioned in close proximity to a transponder mounted to a data cartridge contained in the media storage system.

According to the teachings of the present invention, a reader 140 is mounted to the cartridge access device 40, preferably on a thumb portion 130 of the cartridge plunge mechanism 90, as shown in FIG. 2 and FIG. 3. In addition, a transponder 150 containing data related to the cartridge 20 is mounted to each cartridge 20 in the media storage system 15, as shown in FIG. 3. In use, the cartridge access device 40 is positioned adjacent the cartridge 20 (e.g., as in position 41 or 43 shown in FIG. 1) so that the reader 140 is within the transmission range 160 (FIG. 3) of the transponder 150 (e.g., forming an air interface therebetween). Once the reader 140 is within the transmission range 160 of the transponder 150, the reader 140 activates the transponder 150 and triggers a response (i.e., a data signal containing the related data) from the transponder 150, as described in more detail below.

The reader 140 is preferably mounted or attached to the thumb portion 130 of the cartridge plunge mechanism 90 so that the reader 140 can be extended toward the data cartridge 20 or retracted therefrom by moving the cartridge plunge mechanism 90 generally in the directions of arrows 93 and 97, respectively (e.g., using the encoder system discussed above). Thus, the reader 140 can be positioned close to the transponder 150, preferably within about three millimeters of one another. As an example, where the reader 140 is mounted to the cartridge access end 75 of the frame assembly 70, the reader 140 may receive a signal not only from the queried data cartridge 20, but also from the transponders 150 on other nearby data cartridges 20. Where, however, the reader 140 is mounted to the cartridge plunge mechanism 90, the reader 140 can be positioned immediately adjacent to the queried transponder 150 (as shown in FIG. 3), thus reducing the likelihood that transponders 150 on other nearby data cartridges 20 detect the query.

In addition, mounting the reader 140 to the cartridge plunge mechanism 90 also permits the reader 140 to be adjusted at each data cartridge 20 to be within the required transmission range 160 of the transponder 150 regardless of the variability in the mechanical tolerances of the media storage system 15. As an example, where the cartridge access device 40 is twenty millimeters from an adjacent data cartridge 20, the cartridge plunge mechanism 90 is extended beyond the cartridge access end 75 of the frame assembly 70 about seventeen millimeters, thus defining a transmission range 160 of about three millimeters. When the cartridge access device 40 is then moved adjacent another data cartridge 20 stored in the media storage system 15 where the cartridge access device is now twenty-five millimeters from the data cartridge 20, the cartridge plunge mechanism is extended beyond the cartridge access end 75 of the frame assembly 70 about twenty-two millimeters, once again defining a transmission range 160 of about three millimeters.

It is understood, however, that the transponder 150 and/or the reader 140 can be embedded in the data cartridge 20 and the cartridge plunge mechanism 90, respectively, or attached using any other suitable means (e.g., adhesive, integrally formed therein, etc.).

The preferred transmission range 160 of about three millimeters also serves to reduce or eliminate physical wear that may occur were the reader 140 and the transponder 150 to be in repeated contact with one another. However, the invention is not to be limited to the preferred transmission range 160 of three millimeters. In other embodiments, the reader 140 can come into contact with the transponder 150. Likewise, the transmission range 160 can be greater than three millimeters. The transmission range 160 may vary under the teachings of the present invention and may depend on design considerations such as the transmission and receiving capabilities of the reader 140 and the transponder 150, the likelihood of interference or crosstalk, etc. Other design considerations may include the respective power requirements of the reader 140 and the transponder 150, the signal detection capability of the reader 140, the transmission frequencies, the rate of transmission, etc.

Figure 4:
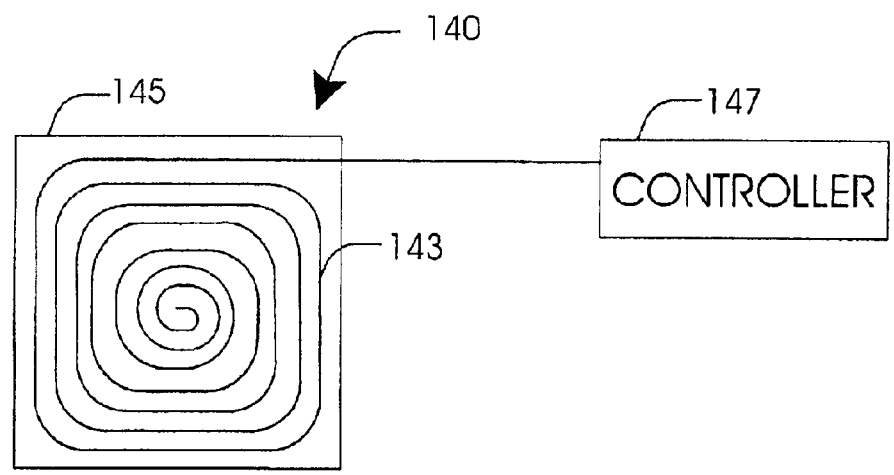
FIG. 4 is a plan view of the reader.

The exemplary reader 140 shown in FIG. 4 includes an antenna 143 (e.g., numerous turns of a fine wire to form a coil) etched on a flexible printed circuit substrate 145. The reader 140 is operatively associated with a controller 147. That is, the controller 147 is linked (via a direct or remote connection) with the reader 140 for communicating therebetween. For example, where the reader 140 is an inductive reader, the controller 147 may cause an electrical current to pass through the antenna 143, thus generating an energy field for activating the transponder 150. Once the transponder 150 is activated, the controller may transmit an interrogation signal through the antenna 143 querying the transponder 150. Likewise, when the reader 140 receives a response or a data signal from the transponder 150, the data signal is delivered to the controller 147 for further processing. For example, the controller may convert the data signal into user-readable data for output at a computer, generate or update an inventory database with the data relating to the data cartridge 20 contained in the data signal, etc. Although the controller 147 is shown separate from the circuit board 145, the reader 140 and the controller 147 can be fabricated together on a single circuit board (e.g., as an integrated circuit).

It is understood that the controller 147 and the reader 140 include any required circuitry and software or firmware for performing the functions described herein. The design of such controllers and readers is well known in the art. In addition, the controller 147 and the reader 140 can be used to perform any suitable functions, such as but not limited to, signal conditioning, parity error checking, correction, etc. Likewise, once the data signal is correctly received at the reader 140 from the transponder 150 and decoded at the controller 147, the controller 147 may instruct the transponder 150, through the reader 140, to cease transmitting.

Where the transponder 150 is programmable, the controller 147 and reader 140 can also include circuitry to perform the necessary data modulation/demodulation and data transfer.

Figure 5:
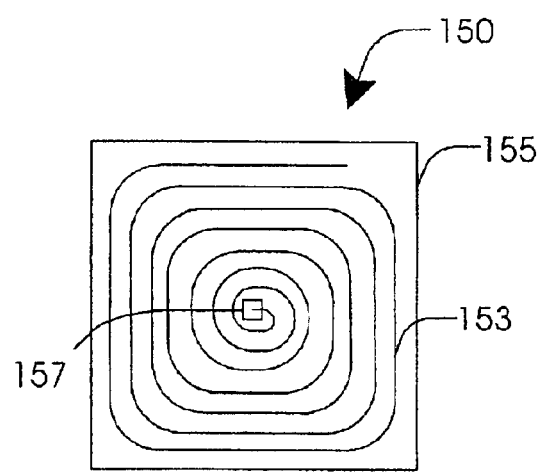
FIG. 5 is a plan view of the transponder.

The exemplary transponder 150 shown in FIG. 5 preferably includes a low powered integrated circuit (IC) 157 and an antenna 153 (e.g., numerous turns of a fine wire to form a coil) etched on a flexible printed circuit substrate 155. The IC 157 preferably includes a processor (or processing logic) and at least one memory. The processor receives the query signal from the reader 140 at the antenna 153. The processor retrieves data stored on the memory and generates a response or data signal containing the data requested by the query. The data signal is transmitted via the antenna 153 on the transponder 150 (e.g., via radio frequency) and received at the antenna 143 on the reader 140. While the transponder 150 is shown fabricated as a single printed circuit board, the transponder can comprise separate components linked to one another.

The transponder 150 can include any suitable memory. The memory may include Read Only Memory (ROM) for security data and operating system instructions, which in conjunction with the processor, controls internal functions (e.g., response delay timing, data flow control, and power supply switching). The memory may also include Random Access Memory (RAM) to facilitate temporary data storage during query and response. The memory may also include non-volatile programmable memory (e.g., Electrically Erasable Programmable Read Only Memory or EEPROM) to store data related to the data cartridge 20 that is retained therein when the transponder 150 is deactivated or in a power-saving mode. The memory may also include write-once/read many (WORM) memory, wherein the reader 140 and/or controller 147 could be configured (or a separate writing device provided) to write data to the transponder 150 (e.g., an indication of when or how often the data cartridge 20 is accessed). Likewise, data buffers may be used to temporarily hold incoming data following demodulation and outgoing data for modulation and interface with the reader 140. In addition, data stored in memory on the transponder 150 can be conventionally organized using data identifiers and error detection bits (i.e., source encoding).

The transponder 150 preferably stores up to four kilobytes of data related to the data cartridge 20. In one embodiment, the related data can be partitioned. For example, the related data may include device common information (e.g., remaining capacity, maximum capacity, tape alert flags, etc.), medium common attributes (e.g., manufacturer, serial number, etc.), and host common attributes (e.g., vendor, version, date last written, etc.). Likewise, the transponder may include permanent data and rewritable data. However, it is understood that the quantity of data stored on the transponder 150 can vary depending on the design characteristics of the transponder 150, the type of data stored thereon, etc. It is also understood that the type of data that is stored on the transponder 150 is immaterial to the scope of the present invention. For example, a user identification or passcode can be stored on the transponder 150 and suitable software can be provided to manage access to the data cartridge 20 based on the user identification and/or passcode. Such software can be readily developed by one skilled in the art.

The reader 140 and the transponder 150 preferably use radio frequency identification (RFID) technology. Generally, RFID transponders have small power requirements (e.g., in the microwatt to milliwatt range), and can be passive, active, or a combination thereof. That is, a passive RFID transponder derives power from a magnetic or electric field generated by the reader, while an active RFID transponder is self-powered by an internal battery. A combination passive/active RFID transponder is powered by an internal battery, but only draws power from the battery after being passed through a high energy activation field. RFID technology is well understood in the art. However, it is understood that the reader 140 and the transponder 150 are not limited to RFID technology and can include other storage and communication systems now known or later developed for storing and reading data related to the data cartridge 20.

It should be noted that although the apparatus and method of the present invention is illustrated using a particular media storage system 15, the teachings of the invention may be utilized in any of a wide range of media storage systems now known in the art or that may be developed in the future for accessing or taking inventory of one or more data cartridges 20. Accordingly, the present invention should not be regarded as limited to the particular media storage system 15 shown and described herein. It should also be noted that while the cartridge access device 40 is shown and described herein as it could be used to store and retrieve a linear tape open (LTO) data cartridge 20 having a standard size and configuration, it is not limited to any particular type or style of data cartridge. Indeed, the cartridge access device 40 according to the present invention could be used with any type of media storage system comprising any type of storage medium (e.g., magnetic disk or tape, optical disk, etc.). Consequently, the present invention should not be regarded as limited to use with the media storage system 15 for the LTO data cartridge 20 shown and described herein.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An apparatus for retrieving data related to a data cartridge contained in a media storage system, comprising:
    a cartridge access device operatively associated with said media storage system, said cartridge access device including a cartridge plunge mechanism moveable between a retracted position and an extended position, said cartridge access device retrieving and transporting the data cartridge within the media storage system;
    a transponder mounted to said data cartridge, said transponder transmitting a data signal containing said data related to the data cartridge;
    a reader mounted to said cartridge plunge mechanism of said cartridge access device, said reader receiving said transmitted data signal from said transponder; and
    a controller operatively associated with said reader, said controller operating said reader to activate and query said transponder to transmit said data signal, said controller being responsive to said transmitted data signal.

2. The apparatus of claim 1, wherein said cartridge plunge mechanism further comprises a thumb portion, and said reader is attached to said thumb portion.

3. The apparatus of claim 1, wherein said controller operates said reader to activate and query said transponder when said cartridge plunge mechanism of said cartridge access device is in the extended position so that said reader is adjacent the data cartridge to be queried.

4. The apparatus of claim 1, wherein said transponder comprises a passive transponder, and wherein said reader activates said passive transponder so that said passive transponder transmits said data signal, said reader being responsive to said transmitted data signal.

5. The apparatus of claim 1, wherein said transponder comprises an active transponder.

6. The apparatus of claim 1, wherein said transponder is a radio frequency identification (RFID) transponder.

7. The apparatus of claim 6, wherein said REID transponder stores up to four kilobytes of said data related to the data cartridge.

8. The apparatus of claim 1, wherein said reader activates and queries said transponder to transmit said data signal when positioned approximately three millimeters apart from one another.

9. The apparatus of claim 1, wherein said data related to the data cartridge includes at least cartridge identification data.

10. A method for retrieving data related to a data cartridge in a media storage system, comprising:

positioning a cartridge access device adjacent said data cartridge, said cartridge access device including a cartridge plunge mechanism moveable between a retracted position and an extended position;

transmitting a data signal containing said data related to the data cartridge from a transponder attached to said data cartridge; and receiving said transmitted data signal at a reader attached to said cartridge plunge mechanism of said cartridge access device.

11. The method of claim 10, further comprising writing at least a portion of said data related to the data cartridge to said transponder.

12. The method of claim 10, further comprising activating said transponder.

13. The method of claim 12, wherein said transponder is activated when said reader is positioned approximately three millimeters from said transponder.

14. The method of claim 12, further comprising deactivating said transponder.

15. The method of claim 10, further comprising forming an air interface between said reader and said transponder, wherein said data is transmitted over said air interface.

16. The method of claim 10, further comprising querying said transponder to transmit said data.

17. The method of claim 10, further comprising processing said transmitted data signal at a controller operatively associated with said reader.

18. An apparatus for retrieving data related to a data cartridge in a media storage system, comprising:

cartridge plunge means operatively associated with said media storage system for releasably engaging and transporting the data cartridge within the media storage system;

means, mounted to the data cartridge, for transmitting data in response to a query; and means, mounted to said cartridge plunge means, for generating the query and for receiving transmitted data from said means for transmitting data.

19. The apparatus of claim 18, further comprising means for processing said transmitted data operatively associated with said means for reading.

* * * * *

UNITED STATES PATENT AND TRADEMARK OFFICE
CERTIFICATE OF CORRECTION

PATENT NO.       : 6,870,797 B2
APPLICATION NO.  : 09/754955
DATED            : March 22, 2005
INVENTOR(S)      : Kelly J Reasoner et al.

It is certified that error appears in the above-identified patent and that said Letters Patent is hereby corrected as shown below:

In column 2, line 36, delete "which." and insert -- which: --, therefor.

In column 9, line 8, in Claim 7, delete "REID" and insert -- RFID --, therefor.

Signed and Sealed this

Eleventh Day of August, 2009

David J. Kappos
*Director of the United States Patent and Trademark Office*